(12) United States Patent
Nagaraj et al.

(10) Patent No.: US 8,217,133 B2
(45) Date of Patent: Jul. 10, 2012

(54) STORAGE STABLE ONE COMPONENT POLYURETHANE SYSTEM

(75) Inventors: Phaniraj T. Nagaraj, Naugatuck, CT (US); R. Scott Archibald, Thomaston, CT (US); Thomas R. Doyle, Wallingford, CT (US); Ronald O. Rosenberg, Orange, CT (US)

(73) Assignee: Chemtura Corporation, Middlebury, CT (US)

( * ) Notice: Subject to any disclaimer, the term of this patent is extended or adjusted under 35 U.S.C. 154(b) by 322 days.

(21) Appl. No.: 11/702,787

(22) Filed: Feb. 5, 2007

(65) Prior Publication Data

US 2007/0213497 A1 Sep. 13, 2007

Related U.S. Application Data

(60) Provisional application No. 60/780,115, filed on Mar. 8, 2006.

(51) Int. Cl.
*C08G 18/00* (2006.01)

(52) U.S. Cl. ........ 528/64; 528/44; 528/48; 528/59; 528/61; 528/85; 560/25; 560/26; 560/115; 560/158

(58) Field of Classification Search ........ 524/288, 524/284, 775; 528/55, 44, 59, 48, 61, 64, 528/85; 560/25, 26, 115, 158
See application file for complete search history.

(56) References Cited

U.S. PATENT DOCUMENTS

| | | | |
|---|---|---|---|
| 3,341,463 A * | 9/1967 | Gemeinhardt | 252/182.21 |
| 3,755,261 A * | 8/1973 | VanGulick | 528/60 |
| 3,876,604 A | 4/1975 | Caruso et al. | |
| 4,029,730 A | 6/1977 | Schroeder | |
| 4,061,662 A | 12/1977 | Marans et al. | |
| 4,071,492 A | 1/1978 | Bethea et al. | |
| 4,182,825 A | 1/1980 | Jackle | |
| 4,247,676 A * | 1/1981 | Kimball | 528/49 |
| 4,288,577 A | 9/1981 | McShane, Jr. | |
| 4,330,454 A | 5/1982 | Kimball | |
| 4,385,171 A | 5/1983 | Schnabel et al. | |
| 4,395,530 A * | 7/1983 | Hammond | 528/48 |
| 4,552,913 A | 11/1985 | Wolfe et al. | |
| 4,778,845 A | 10/1988 | Tschan et al. | |
| 4,888,442 A | 12/1989 | Dunlap et al. | |
| 4,950,715 A | 8/1990 | Duck et al. | |
| 5,023,040 A | 6/1991 | Gajewski et al. | |
| 5,064,494 A | 11/1991 | Duck et al. | |
| 5,102,969 A | 4/1992 | Scheffler et al. | |
| 5,605,657 A | 2/1997 | Nybakken et al. | |
| 5,703,193 A * | 12/1997 | Rosenberg et al. | 528/44 |
| 5,994,493 A * | 11/1999 | Krebs | 528/79 |
| 6,723,771 B2 | 4/2004 | Palin | |
| 6,953,765 B2 | 10/2005 | Ooms et al. | |
| 7,361,292 B2 * | 4/2008 | Zhou | 252/511 |
| 2003/0065124 A1 | 4/2003 | Rosenberg et al. | |
| 2007/0213456 A1 * | 9/2007 | Singh et al. | 524/589 |

FOREIGN PATENT DOCUMENTS

| | | |
|---|---|---|
| GA | 1101410 | 6/1966 |
| WO | WO 97/46603 | 12/1997 |

OTHER PUBLICATIONS

Adiprene® LFP950A Product Description; www.cromptoncorp.com.
Adiprene L300 Product Description; www.cromptoncorp.com.
Chemtura "Upper Limits" Internet article 2005. pp. 1-8. XP002511676. High performance urethanes. pdf.

* cited by examiner

*Primary Examiner* — Ling Choi
*Assistant Examiner* — Michael L Leonard
(74) *Attorney, Agent, or Firm* — Joseph Suhadolnik

(57) ABSTRACT

In one aspect, the invention relates to storage-stable and flowable polyurethane compositions comprising (a) one or more isocyanate-terminated polyurethane prepolymers derived from one or more hydrocarbon ring-containing diisocyanates and/or triisocyanates and one or more polyols; (b) one or more metal salt complexes of methylenedianiline; and (c) one or more organic acid halide compounds having one or more acid halide groups, wherein the one or more organic acid halide compounds are in an amount wherein the acid halide groups are present in a minimum concentration of about 100 parts per million by weight of the polyurethane prepolymer. In other aspects, the invention relates to methods for storing the curable polyurethane compositions, as well as methods for producing polyurethane elastomers.

5 Claims, No Drawings

STORAGE STABLE ONE COMPONENT POLYURETHANE SYSTEM

CROSS REFERENCE TO RELATED APPLICATIONS

This application claims priority to Provisional U.S. Patent Application No. 60/780,115 filed on Mar. 8, 2006, all of the contents therein being incorporated by reference herein in their entirety.

FIELD OF THE INVENTION

The present invention relates to storage-stable polyurethane compositions, methods for their storage, and methods for using the compositions for making polyurethane elastomer products.

BACKGROUND OF THE INVENTION

It is known that polyurethane prepolymers are readily cured with metal salt complexes of methylenedianiline. See, for example, U.S. Pat. Nos. 3,755,261, 3,876,604 and 4,029,730.

For commercial purposes, the polyurethane prepolymer and metal salt complex of methylenedianiline are typically stored as a stable mixture, i.e., a one-component system, which is curable upon heating to an appropriate cure temperature. The one-component storage-stable system must necessarily not cure to an elastomeric or plastic state during storage, i.e., it must remain flowable. Several such one-component storage-stable polyurethane systems are known and are described in, for example, U.S. Pat. Nos. 5,102,969, 4,247,676, 4,950,715, 4,330,454, 5,064,494 and 4,778,845. These one-component polyurethane systems typically include a diisocyanate end-capped polypropylene oxide polyol having 3-15% free isocyanate monomer with 0.75-1.05 equivalents of methylenedianiline-NaCl complex.

Current one-component polyurethane systems are known to be storage-stable up to 30° C. See, for example, U.S. Pat. No. 4,778,845 to Tschan et al. However, there is a need in the art for one-component polyurethane systems having storage-stability at higher temperatures. It would be particularly advantageous for a one-component polyurethane system to maintain storage-stability for at least ninety days, and more preferably a year, at about 35° C., and even more, to maintain storage-stability for at least about thirty days at a temperature greater than 35° C. and up to about 50° C., and more preferably, for at least about thirty days at a temperature greater than 50° C. and up to about 70° C.

Accordingly, there is a need for new one-component compositions which are curable to elastomeric or plastic polyurethane product at an appropriate curing temperature while being stable and flowable during storage at higher temperatures than currently known in the art.

SUMMARY OF THE INVENTION

These and other objectives, as will be apparent to those of ordinary skill in the art, have been achieved by providing a storage-stable flowable polyurethane composition comprising:
  (a) one or more isocyanate-terminated polyurethane prepolymers derived from one or more hydrocarbon ring-containing diisocyanates and/or triisocyanates and one or more polyols;
  (b) one or more metal salt complexes of methylenedianiline; and
  (c) one or more organic acid halide compounds having one or more acid halide groups, wherein the one or more organic acid halide compounds are in an amount wherein the acid halide groups are present in a minimum concentration of about 100 parts per million by weight of the polyurethane prepolymer.

The invention also relates to a method for storing a curable polyurethane composition, the method comprising storing the curable polyurethane composition for at least about ninety days at a temperature of about 35° C., or at least about thirty days at a temperature greater than 35° C. and up to about 50° C., or at least about thirty days at a temperature of about 50° C. to about 70° C., wherein the curable polyurethane composition remains flowable and non-elastomeric during storage as determined at 50° C. during storage, the polyurethane composition comprising:
  (a) one or more isocyanate-terminated polyurethane prepolymers derived from one or more hydrocarbon ring-containing diisocyanates and/or triisocyanates and one or more polyols;
  (b) one or more metal salt complexes of methylenedianiline; and
  (c) optionally, one or more organic acid halide compounds having one or more acid halide groups, wherein the one or more organic acid halide compounds are in an amount wherein the acid halide groups are present in a minimum concentration of about 100 parts per million by weight of the polyurethane prepolymer;
  (d) provided that when one or more organic acid halide compounds are not present or present in an amount corresponding to an acid halide group concentration of below about 100 parts per million by weight of the polyurethane prepolymer, then the polyurethane prepolymer contains a reduced amount of free diisocyanate and/or triisocyanate monomer.

The present invention advantageously provides one-component curable polyurethane compositions which are stable at higher temperatures and/or longer storage times than currently known in the art. The invention is of significant commercial relevance since the stability at higher temperatures will, inter alia, prevent the loss of the curable composition during storage. The invention also advantageously provides methods for curing the curable polyurethane compositions at lower temperatures and with more complete curing of thick polyurethane products.

DETAILED DESCRIPTION OF PREFERRED EMBODIMENTS

In one embodiment, the invention relates to one-component storage-stable polyurethane compositions comprising, minimally, (a) one or more isocyanate-terminated polyurethane prepolymers, i.e., "prepolymer" and (b) one or more metal salt complexes of 4,4'-methylenedianiline, hereinafter referred to as methylenedianiline or MDA.

The prepolymer of the present invention is preferably derived from one or more hydrocarbon ring-containing diisocyanates, triisocyanates, or a combination thereof, and one or more polyols, by standard procedures well known in the art. The hydrocarbon ring preferably includes a minimum of six carbon atoms and can be saturated or alternatively, unsaturated by having at least one double bond. An example of a saturated ring includes cyclohexane, while a preferred example of an unsaturated ring includes benzene. The hydrocarbon ring can be attached to one or more straight-chained or branched alkyl or alkenyl groups which may be non-linking, or alternatively, function as a linking group from the hydrocarbon ring to an isocyanate group.

Some preferred examples of suitable hydrocarbon ring-containing diisocyanates include paraphenylene diisocyanate (PPDI), tolidene diisocyanate (TODI), isophorone diisocyanate (IPDI), isomers of methylene bis(phenylisocyanate) (i.e., methylene diphenyl diisocyanate), isomers of toluene diisocyanate (TDI), diphenyl-4,4'-diisocyanate, dibenzyl-4,4'-diisocyanate, stilbene-4,4'-diisocyanate, benzophenone-4,4'-diisocyanate, 1,3- and 1,4-xylene diisocyanates, 1,3-cyclohexyl diisocyanate, 1,4-cyclohexyl diisocyanate (CHDI), 4,4'-methylene bis(phenylisocyanate) (MDI), the three geometric isomers of 1,1'-methylene-bis(4-isocyanatocyclohexane), abbreviated collectively as $H_{12}$ MDI, and combinations thereof. Particularly preferred diisocyanates include paraphenylene diisocyanate, toluene-2,4-diisocyanate (2,4-TDI), toluene-2,6-diisocyanate (2,6-TDI), and combinations thereof.

Some examples of suitable hydrocarbon ring-containing triisocyanates include the isomers of benzenetriisocyanate, toluene-2,4,6-triisocyanate, 2,4,4'-triisocyanatediphenylether, and tolylene and xylylene diisocyanate derivatives of trimethylolpropane.

Some examples of classes of suitable polyols include the polyether polyols, polyester polyols, and hydrocarbon polyols. The polyols can be synthesized according to methods known in the art. For example, polyether polyols can be synthesized using a double metal cyanide catalyst as disclosed in U.S. Pat. No. 6,953,765 to Ooms et al.

The one or more polyols can be in a high range of molecular weight, i.e., having a number average molecular weight (M.W.) of at least 250 and up to 20,000. Alternatively, the polyols can include one or more polyols in a low range of molecular weight, i.e., having a number average molecular weight of at least 60 and up to about 250. A polyol molecular weight of about 400 to 6000 is preferred.

The polyol can be a diol, triol, tetrol, or higher hydroxy-functional polyol. In addition, the polyol includes compositions wherein a certain percentage of the polyol is a mono-ol. For example, the hydroxy functionality preferably ranges from 1.8 to 4.0, and more preferably from 1.9 to 3.0.

In a preferred embodiment, the prepolymer has a reduced amount of free isocyanate monomer. Preferably, the amount of free isocyanate monomer is below 5%, more preferably below 0.5%, and more preferably below 0.1% by weight of the prepolymer. Particularly preferred is a free isocyanate monomer amount of less than 0.5 percent by weight of polyurethane prepolymer derived from toluene diisocyanate or paraphenylene diisocyanate, and a free isocyanate monomer amount of less than four percent by weight of polyurethane prepolymer derived from methylene diphenyl diisocyanate.

Such prepolymers can be prepared by any method known in the art, e.g., by first reacting a polyol with a molar excess of a diisocyanate monomer to form a prepolymer having terminal isocyanate groups and then removing the residual excess diisocyanate monomer. Removal of the isocyanate monomer can be accomplished by, for example, distillation, solvent extraction, supercritical fluid extraction or adsorption on molecular sieves. Agitated film vacuum distillation is preferred. See, for example U.K. Patent No. 1,101,410 and U.S. Pat. Nos. 5,703,193, 4,061,662, 4,182,825, 4,385,171, 4,888,442 and 4,288,577, all of which are incorporated by reference herein.

Such prepolymers with reduced free monomer content are commercially available, e.g., by Chemtura Corporation under the trade names Adiprene® LF, Adiprene® LFG, Adiprene® LFM and Adiprene® LFP trade names, among others.

The metal salts complexed to methylenedianiline can be any suitable metal salt, including alkali, alkaline earth, transition metal, and main group metal salts. Particularly preferred are the alkali and alkaline metal salts. Some examples of suitable alkali metal salts include those metal salts formed by combination of any of lithium, sodium, potassium, or rubidium with any of fluoride, chloride, bromide, or iodide. A particularly preferred alkali metal salt is sodium chloride. Some examples of suitable alkaline earth metal salts include those metal salts formed by combination of any of magnesium, calcium, strontium, or barium with any of fluoride, chloride, bromide, or iodide. Salt complexes of methylenedianiline are commercially available, e.g., as a methylenedianiline-NaCl complex under the trade name Caytur® from Chemtura Corporation.

The content of uncomplexed methylenedianiline in the complex should be below 2%, preferably below 0.5%. The equivalent ratio of amine groups in the metal salt of methylenedianiline to isocyanate groups in the prepolymer is preferably 0.5:1-1.2:1, more preferably 0.7:1-1.1:1, and even more preferably 0.8:1-1.05:1.

It has been surprisingly found, in a preferred embodiment, that additional storage stability is imparted to the polyurethane composition by inclusion of organic acid halide compounds in a minimum amount corresponding to a minimum concentration of acid halide groups of about 100 parts per million (ppm) by weight of polyurethane prepolymer. In a preferred embodiment, the acid halide groups are in a maximum concentration of about 20,000 ppm, and more preferably 10,000 ppm by weight of the polyurethane prepolymer. More preferably, the acid halide groups are in a concentration range of 150-650 ppm based on the weight of the prepolymer.

The organic acid halide compounds have a hydrocarbon moiety derivatized with one or more acid halide groups, i.e., —C(O)X groups, where X is a halide atom such as chloride (Cl) or bromide (Br). The organic acid halide compounds are preferably selected from the group of organic acid halide compounds having an atmospheric boiling point (B.P.) of at least about 220° C., and more preferably of at least about 250° C. Some examples of suitable organic acid halide compounds include adipoyl chloride (69.39% COCl groups by weight of total acid chloride), benzoyl chloride (198° C. B.P.; 45.20% COCl group by weight of total acid chloride), isomers of phthaloyl chloride, i.e., phthaloyl chloride, isophthaloyl chloride, and terephthaloyl chloride (269-271° C., 276° C., 266° C. B.P. respectively; 63.56% COCl groups by weight of total acid chloride), acetyl chloride (52° C. B.P.; 80.89% COCl group by weight of total acid chloride), palmitoyl chloride (23.13% COCl group by weight of total acid chloride), p-nitrobenzoyl chloride (34.21% COCL group by weight of total acid chloride), isomers of chlorobenzoyl chloride, i.e., 2-chlorobenzoyl chloride, 3-chlorobenzoyl chloride, 4-chlorobenzoyl chloride (238° C., 225° C., 222° C. B.P. respectively; 36.28% COCL group by weight of total acid chloride), oleoyl chloride (20.96% COCL group by weight of total acid chloride), and stearoyl chloride (36.28% COCL group by weight of total acid chloride).

The % acid halide group in an acid halide molecule can be calculated as follows, using COCl groups in an acid chloride as an example:

EXAMPLE

Ortho Phthaloyl Chloride (OPC) has the Chemical Structure

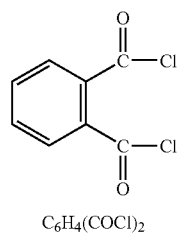

$C_6H_4(COCl)_2$

The molecular weight of COCl group is 63.5 (12+16+35.5). There are two COCl groups in OPC. Thus total molecular weight of COCl in OPC is 63.5×2=127. The molecular weight of OPC is 203 (12×6+1×4+63.5×2). Therefore % COCL=(127/203)×100=62.56%. The % COCl groups can be calculated in a similar way with other acid chlorides.

One or more of the components of the storage-stable polyurethane composition, particularly the metal salt complex of methylenedianiline, can be dispersed in an inert organic carrier. The inert organic carrier can be, for example, a phthalate, ester, ketone, halogenated hydrocarbon, alkane, or arene solvent. A particularly preferred inert organic carrier is dioctyl adipate. In a preferred embodiment, no dioctyl phthalate is present in the composition.

In general, the storage-stable polyurethane compositions of the invention are produced by adding the polyurethane prepolymer to the reactor, heating the prepolymer to lower the viscosity, followed by degassing. The prepolymer is cooled below the decomposition temperature of complex, preferably below 50° C., any acid halide compounds optionally added, and the combination thoroughly mixed. The metal salt complex of methylenedianiline is then added under agitation and thoroughly mixed to form the one-component urethane premix.

Mixing can be conducted in a batch mixer (e.g., stirred tank reactors dough mixers), high-speed impeller mixers, paddle type mixers or continuous mixers, such as those available from Max Machinery Inc., STATEMIX, Edge-Sweets Company or Automatic Process Control Inc. During mixing, it is important to include agitation while adding the alkali metal salt of methylenedianiline to the prepolymer. In addition, care should be taken to control the premix temperature below the decomposition temperature of metal salt of methylenedianiline, preferably below 70° C., more preferably below 50° C.

By "storage-stable" is meant that the polyurethane compositions of the invention are flowable and non-elastomeric, as determined at about 50° C., for at least about ninety days at a temperature of about 35° C., or at least about thirty days at a temperature greater than 35° C. and up to about 50° C., or at least about seven days at a temperature of about 50° C. to about 70° C. In this application, the term "flowable" means that the composition at a temperature of 50° C. will assume the shape of a solid container (such as a solid mold) under the influence of gravity. The material, as tested at 50° C., should preferably have a viscosity below 100,000 centipoise, more preferably below 30,000 centipoise, and even more preferably below 10,000 centipoise. Such a flowable composition is distinct from a cured solid elastomer that retains its shape irrespective of the shape of its container.

More preferably, the polyurethane compositions are stable, and hence flowable, as determined at about 50° C., for at least about 180 days at a temperature of about 35° C., or at least about forty-five days at a temperature greater than 35° C. and up to about 50° C., or at least about fourteen days at a temperature of about 50° C. to about 70° C. Even more preferably, the polyurethane compositions are stable for at least about one year at a temperature of about 35° C., or at least about sixty days at a temperature greater than 35° C. and up to about 50° C., or at least about thirty days at a temperature of about 50° C. to about 70° C.

In another embodiment, the invention relates to a method for storing any of the curable polyurethane compositions described above. The method of storing comprises storing the curable polyurethane composition for at least about ninety days at a temperature of about 35° C., or at least about thirty days at a temperature greater than 35° C. and up to about 50° C., or at least about seven days at a temperature of about 50° C. to about 70° C., wherein the curable polyurethane composition is in a stable condition during storage by remaining flowable and non-elastomeric during storage as determined at about 50° C.

In a preferred embodiment, the polyurethane prepolymer compositions are stored in a stable condition for at least about 180 days at a temperature of about 35° C., or at least about forty-five days at a temperature greater than 35° C. and up to about 50° C., or at least about fourteen days at a temperature of about 50° C. to about 70° C. Even more preferably, the polyurethane compositions are stored in a stable condition for at least about one year at a temperature of about 35° C., or at least about sixty days at a temperature greater than 35° C. and up to about 50° C., or at least about thirty days at a temperature of about 50° C. to about 70° C.

The method of storage described above is applicable to polyurethane prepolymer compositions wherein if one or more organic acid halide compounds are not present, or present in an amount corresponding to an acid halide group concentration of below about 100 parts per million by weight of the polyurethane prepolymer, then the polyurethane prepolymer contains a reduced amount of free isocyanate monomer. Alternatively, if one or more organic acid halide compounds are present above a concentration of about 100 parts per million, then the polyurethane prepolymer can have a reduced or non-reduced amount of free isocyanate monomer.

In another embodiment, the invention relates to a method for producing a polyurethane elastomer product from the curable polyurethane compositions described above. In one embodiment, a polyurethane elastomer product is produced by heating any of the storage-stable polyurethane compositions described above to a temperature in the range of about 100° C. to 150°.

By a particularly preferred embodiment, a polyurethane elastomer product is produced by curing any of the curable polyurethane compositions described above at lower temperatures than those known in the art. For example, in a preferred embodiment, a polyurethane elastomer product is produced by heating to a temperature of about 115° C. a storage-stable polyurethane composition comprising:
 (a) one or more isocyanate-terminated polyurethane prepolymers derived from toluene diisocyanate and one or more polyols and having a reduced free toluene diisocyanate monomer content in an amount less than 0.1 percent by weight of polyurethane prepolymer; and
 (b) one or more metal salt complexes of methylenedianiline.

The methods described above for producing polyurethane elastomer products have been found to be particularly advantageous for producing polyurethane elastomer products of thicknesses which are typically not capable of being completely cured (i.e., through the core of the product) according to methods of the prior art. For example, according to the methods described above, polyurethane elastomer products having a minimum thickness of five centimeters, or ten centimeters, or even thirteen centimeters, can be completely cured through the core of the product.

List of Materials and Descriptions

The following materials are available from Chemtura Corporation.

Adiprene LF 950A: is a TDI terminated polyether prepolymer with reduced free TDI content (<0.1%) due to the monomer removal step in manufacture. Curing with Caytur yields a high performance 95 Shore A hardness (95A) elastomer. The polyether polyol used to prepare this prepolymer is polytetramethylene ether glycol (PTMEG or PTMG), e.g. Terathane from Invista. The isocyanate (NCO) content of the prepolymer is about 6.0% and the equivalent weight is about 700. Thus, 700 g of this prepolymer contains one mole of NCO end groups.

Adiprene LF 800A: is a TDI terminated polyether prepolymer with reduced free TDI content (<0.1%) due to the monomer removal step in manufacture. Curing with Caytur yields a high performance 80A elastomer. The polyether polyols used to prepare this prepolymer include polytetramethylene ether glycol (PTMEG or PTMG) and polypropylene glycol (PPG), e.g. Poly G polyols available from Arch Chemicals. The NCO content of the prepolymer is about 2.9% and the equivalent weight is about 1453.

Adiprene L 300: is a TDI terminated polyether (PTMEG) prepolymer that can be cured to 89-92A elastomer using Caytur. The NCO content of the prepolymer is about 4.15% and the equivalent weight is about 1013. No monomer removal step is used in the preparation of this prepolymer.

Adiprene L167: is a TDI terminated polyether (PTMEG) prepolymer that can be cured to a 95A elastomer using MBCA. The NCO content of the prepolymer is about 6.35% and the equivalent weight is about 662. No monomer removal step is used in the preparation of this prepolymer. Free TDI content of this prepolymer is about 2.0%.

Adiprene LFM 500: is a MDI terminated polyether (PTMEG) prepolymer having low free MDI content (typical <0.5%) due to a monomer removal step in manufacture. It can be cured with Caytur to yield a high performance 95A elastomer. The NCO content of the prepolymer is about 5.0% and the equivalent weight is about 840.

Adiprene LFM 2400: is a MDI terminated polycaprolactone (PCL) prepolymer having low free MDI content (typical <0.5%) due to a monomer removal step in manufacture. It can be cured with Caytur to yield a high performance 92A elastomer. The NCO content of the prepolymer is about 3.92% and the equivalent weight is about 1072.

Adiprene LFP 950A: is a PPDI terminated polyether prepolymer having low free PPDI content (typical <0.1%) due to a monomer removal step in manufacture. It can be cured with curatives like Vibracure A250 or Caytur to yield a high performance 95A prepolymer. The high performance features of Adiprene LFP 950A are due to PPDI (p-phenylene diisocyanate), a special building block that imparts exceptional properties to cast polyurethane elastomers. The NCO content of the prepolymer is about 5.6% and the equivalent weight is about 750.

Vibrathane B 625: is a polyether (PTMEG) based MDI terminated prepolymer which yields 60A-95A urethanes when cured with diols. Vibrathane B 625 is characterized by exceptionally low viscosity and urethanes from it have excellent low temperature properties, high abrasion resistance (especially to impingement), outstanding hydrolytic stability and high resilience. The NCO content of the prepolymer is about 6.32% and the equivalent weight is about 665. No monomer removal step is used in the preparation of this prepolymer. Free MDI content of this prepolymer is about 12.0% by weight.

Vibrathane 8030: is a MDI terminated polycaprolactone (PCL) prepolymer that can be cured to 80A elastomer using 1,4 butanediol. The NCO content of the prepolymer is about 6.0% and the equivalent weight is about 700. No monomer removal step is used in the preparation of this prepolymer. Free MDI content of this prepolymer is about 12.0% by weight.

Caytur 21 and Caytur 21-DA: are blocked delayed action amine curatives for use with isocyanate terminated urethane prepolymers. They consist of a complex of methylene dianiline and sodium chloride dispersed in a plasticizer (Dioctyl phthalate in case of Caytur 21 and Dioctyl Adipate in case of Caytur 21-DA). Caytur 21 has 50% active solids dispersed in DOP. Caytur 21-DA has 60% active solids dispersed in DOA. Amine group concentration is 6.45% in Caytur 21 and 7.72% in Caytur 21-DA. Hence the equivalent weight is 219 for Caytur 21 and 183 for Caytur 21-DA. At room temperature it reacts very slowly with terminal isocyanate groups. However at 100° C.-150° C., the salt unblocks and the freed MDA reacts rapidly with the prepolymer to form the elastomer. It yields urethane with similar properties to urethanes cured with MBCA. Suitable grades of prepolymers are available to provide a full range of hardness from 79A to 62D using Caytur as curative.

Caytur 31 and Caytur 31-DA: are blocked delayed action amine curatives for use primarily with isocyanate terminated urethane prepolymers. They consist of a complex of methylene dianiline and sodium chloride dispersed in a plasticizer (Dioctyl phthalate in case of Caytur 31 and Dioctyl Adipate in case of Caytur 31-DA). They have very low free MDA content (typical <0.5%). At room temperature, they are virtually non reactive. However at 115° C.-160° C., the salt unblocks and the freed MDA reacts rapidly with the prepolymer to form a tough elastomer. Amine group concentration is 5.78% in Caytur 31 and Caytur 31-DA. Hence the equivalent weight is 244 for Caytur 31 and Caytur 31-DA. This means that 244 g of Caytur 31-DA contains Avogadro's number of amine groups. These groups are blocked by sodium chloride.

Examples have been set forth below for the purpose of illustration. The scope of the invention is not to be in any way limited by the examples set forth herein.

Example 1

This example illustrates the preparation of a one component curable polyurethane composition (premix) using Adiprene LF950A urethane prepolymer and Caytur 31 curative. The Caytur used in making the premix can be Caytur 21, Caytur 21-DA, Caytur 31 or Caytur 31-DA.

The one-component system can be synthesized using any of the following methods: 1) synthesis in a batch reactor under nitrogen; 2) batch synthesis using a drill mixer in a metal/plastic container under nitrogen; 3) continuous feeding of the urethane prepolymer and the Caytur curative to a continuous mixing vessel, the resulting mix flowing to a receiving vessel.

Synthesis in a reactor: 75 parts of Adiprene LF 950A heated overnight at 70° C. was added to the reactor. Vacuum (<25 mbar) was applied to the reactor to degas the prepolymer and the batch was simultaneously cooled. After 15 minutes, vacuum was released and a nitrogen blanket was applied. Once the batch cooled to 50° C., 25 parts of Caytur 31 at 30° C. was added to Adiprene LF 950A under agitation over a half hour period. The equivalent ratio of amine to isocyanate (Caytur to prepolymer) was 0.95. The mixture was agitated at under a nitrogen sweep for 1 hour at 50° C. At the end of one hour the batch was packaged and sealed under nitrogen.

Synthesis using a drill mixer in a metal/plastic can: Smaller batches of one-component premix can be synthesized in a dry metal/plastic can. 75 parts of Adiprene LF 950A was added metal/plastic can. The prepolymer was heated to 55° C. and was degassed under vacuum (<25 mbar). The prepolymer was allowed to cool under vacuum. Once the prepolymer cooled to 50° C., 25 parts of Caytur 31 at 30° C. was added under agitation. The equivalent ratio of amine to isocyanate (Caytur to prepolymer) was 0.95. The premix was agitated for 10 minutes using the drill mixer under nitrogen sweep. At the end of 10 minutes the batch was packaged and sealed under nitrogen.

Comparative Examples A & B

These comparative examples illustrate the preparation of one component curable polyurethane compositions of A) Adiprene L167 and Caytur 31 and B) Vibrathane B625 and Caytur 31 in accordance with prior art, i.e., using an isocyanate-terminated polyurethane prepolymer from which none of the unreacted diisocyanate monomer is removed.

2000 grams of urethane prepolymer (Adiprene L167 or Vibrathane B625) was charged into a dry one-gallon metal container. The prepolymer was heated to 55° C. and degassed in a vacuum chamber to remove entrained gases. Once the prepolymer cooled to 50° C., appropriate amount of Caytur 31 (713 grams to Adiprene L167 and 736 grams to Vibrathane B625) was added to the prepolymer under stirring. The equivalent ratio of amine groups to isocyanate groups was 0.95. The batch was mixed for 5 minutes under a nitrogen sweep and then 1200 grams poured into heated metal cans. The dimensions of the cylindrical metal can were 13 cms×15 cms. One can was heated to 115° C. and the other to 127° C. in air ovens. The parts were cured for 24 hours.

In the case of Adiprene L167/Caytur 31 no curing was observed after 24 hours at 115° C. The premix remained liquid. However at 127° C. for 24 hours the part (L167/Caytur 31) cured. The part was then cut in half to study the core. It was found that the surface had achieved complete hardness but the core had not cured completely and was cheesy.

In the case of Vibrathane B625/Caytur 31 no curing was observed after 24 hours at both temperatures.

Example 2

Comparative examples A and B were duplicated with other prepolymers. Adiprene LF950A, L300, LFM2400, LFP950A, LFM 500 cured completely to tough elastomers at 115° C. (for Adiprene LF 950A) and 127° C. (for LFM2400, LFP 950A, LFM 500). Each of these prepolymers has reduced content of diisocyanate monomer due to a monomer removal operation.

Comparative Examples C & D

These comparative examples illustrate the preparation of one component premix of Adiprene L300 (i.e., using an isocyanate-terminated polyurethane prepolymer from which none of the unreacted diisocyanate monomer is removed) and Caytur 21 (Comparative Example C) or Caytur 31 (Comparative Example D) in accordance with prior art.

100 parts of Adiprene L300 was charged into a dry one-gallon metal container. The prepolymer was heated to 55° C. and degassed in a vacuum chamber to remove entrained gases. Once the prepolymer cooled to 50° C., appropriate amount of Caytur was added (21.1 parts of Caytur 21 or 24.3 parts of Caytur 31) was added to Adiprene L300 under stirring. The equivalent ratio of amine groups to isocyanate groups was 0.95. The batch was prepared by methods described in EXAMPLE 1. The batch was then poured into a dry glass jar and capped with nitrogen. L300/Caytur 21 one-component urethane was aged in an oven at 42.5° C. L300/Caytur 31 one-component urethane was aged in an oven at 50° C.

In Comparative Example C, the premix became non flowable by 4 hours. In Comparative Example D, the premix remained flowable for a longer time but developed surface film by 336 hours (2 weeks). Viscosity was measured using a Brookfield viscometer. A #27 spindle at 10 rpm was used. 10.5 ml of one-component urethane premix was added to a temperature controlled sample holder. The premix was equilibrated for 15 minutes at 10 rpm after which viscosity was measured. This process was repeated at regular intervals as shown in Tables I and II.

TABLE I

Comparative Example C showing viscosity profile of Adiprene L300/Caytur 21

| Premix type (Aged @ 42.5° C.) | Initial Viscosity (cps) | Viscosity @ 20 mins (cps) | Viscosity @ 4 hours (cps) |
|---|---|---|---|
| Adiprene L300/Caytur 21 | 8725 | 13000 | Partially Cured |

TABLE II

Comparative Example D showing viscosity profile of Adiprene L300/Caytur 31.

| Premix type (Aged @ 50° C.) | Initial Viscosity (cps) | Viscosity @ 24 hours (cps) | Viscosity @ 48 hours (cps) | Viscosity @ 168 hours (cps) | Viscosity @ 336 hours (cps) | Viscosity @ 672 hours (cps) |
|---|---|---|---|---|---|---|
| Adiprene L300/Caytur 31 | 5150 | 11900 | 14000 | 14850 | 15600 | 17800 |

Example 3

This example illustrates the preparation of a one component curable polyurethane composition of Adiprene LF950A and Caytur 31 in accordance with the invention. This example also illustrates the effect of aging on properties and viscosity of the premix.

The batch of Adiprene LF950A and Caytur 31 was prepared by using the drill mixer method described in Example 1. 1200 grams of one-component premix was poured into each of the heated metal cans at 115° C. and 127° C. The parts were cured for 24 hours and then cut in half to study the cross-section. Both the surface and core had cured successfully to the same hardness.

The remainder of the batch was then poured into one-gallon drums and capped with nitrogen and aged at 50° C. and 70° C. Various 250-gram portions of premix (aged at 50° C.) were cast at various intervals of heat aging to study the effect of aging on physical properties. The premix was degassed and cast into hot metal molds at 115° C. Premix stored at 70° C. had cured after 24 hours. The physical properties are shown in Table III. Good physical properties were obtained even after one month at 50° C.

TABLE III

Physical properties of Adiprene LF 950A/Caytur 31 premix aged at 50° C.

| Material: Adiprene LF 950A/Caytur 31 One Component premix (Aged @ 50° C.) | | No Aging | 24 Hours | 72 Hours | 1 Week | 2 Weeks | 1 Month |
|---|---|---|---|---|---|---|---|
| Hardness Shore A | D2240 | 96 | 97 | 97 | 97 | 97 | 96 |
| Drop Ball Resilience % | | 58 | 56 | 56 | 54 | 56 | 53 |
| Tensile, psi | D412 | 3380 | 4373 | 3965 | 3036 | 4109 | 4506 |
| Elongation, % | D412 | 318 | 366 | 351 | 297 | 347 | 361 |
| 100% Mod psi | D412 | 1619 | 1531 | 1475 | 1392 | 1407 | 1238 |
| 300% Mod psi | D412 | 3134 | 3069 | 3105 | 2400 | 3177 | 3048 |
| Split Tear, lb./in | D470 | 73 | 59 | 56 | 50 | 52 | 51 |
| Trouser Tear, lb/in | D1938 | 92 | 98 | 100 | 82 | 85 | 75 |
| Die C Tear, lb./in | D624 | 434 | 435 | 419 | 392 | 395 | 374 |
| Bashore Rebound, % | D2632 | 50 | 46 | 45 | 43 | 45 | 43 |
| Compression Set % (Method B) 22 hours @ 158° F. (70° C.) | D395-B | 30.34 | 35.35 | 36.48 | 35.89 | 34.78 | 33.48 |
| Compressive Mod., psi Third Cycle [aged] | | | | | | | |
| 5% | | 234 | 235 | 248 | 136 | 5 | 9 |
| 10% | D575 | 578 | 588 | 581 | 468 | 192 | 210 |
| 15% | | 904 | 913 | 888 | 762 | 498 | 475 |
| 20% | | 1038 | 1033 | 1014 | 974 | 804 | 744 |
| 25% | | 1482 | 1482 | 1436 | 1256 | 1193 | 1099 |
| Specific Gravity | D792 | 1.096 | 1.094 | 1.092 | 1.093 | 1.094 | 1.093 |

Adiprene LF950A/Caytur 31 one-component premix was also aged in an oven at 42.5° C., 50° C. and 70° C. Viscosity was measured using a Brookfield viscometer. A #27 spindle at 10 rpm was used. 10.5 ml of one-component urethane premix was added to a temperature controlled sample holder. The premix was equilibrated for 15 minutes at 10 rpm after which viscosity was measured. This process was repeated at regular intervals as shown in Table IV. No film formation was observed even after 720 hours (4 weeks). All samples remained flowable.

TABLE IV

Viscosity profile of Adiprene LF950A/Caytur 31 at various times and temperatures

| Premix type | Oven Temperature | Viscosity @ 4 hours (cps) | Viscosity @ 24 hours (cps) | Viscosity @ 48 hours (cps) | Viscosity @ 72 hours (cps) | Viscosity @ 168 hours (cps) | Viscosity @ 720 hours (cps) |
|---|---|---|---|---|---|---|---|
| Adiprene LF950A/Caytur 31 | 42.5° C. | 2275 | 2575 | 2650 | 2775 | 2825 | 3500 |
| | 50.0° C. | 1550 | 1725 | 1800 | 1925 | 1975 | 2625 |
| | 70.0° C. | 725 | | | Cured | | |

Example 4

Example 3 is duplicated with the exception that Adiprene LFM500 (MDI-Terminated prepolymer) is substituted for Adiprene LF950A (TDI-Terminated prepolymer). The equivalent ratio of amine groups to isocyanate groups was 0.95

Adiprene LFM500/Caytur 31 one-component premix was cast into both thin and thick sections (1200 grams) and cured successfully at 115° C. and 127° C. The physical property results are shown in Tables V and VI. Viscosity data is shown in table VII. Excellent properties were achieved even after aging one month at 70° C. No film formation was observed even after 720 hours (4 weeks). All samples remained flowable.

TABLE V

Physical properties of Adiprene LFM500/Caytur 31 premix aged at 50° C.

| Material: Adiprene LFM 500/Caytur 31 One Component premix (Aged @ 50° C.) | | No Aging | 24 Hours | 72 Hours | 1 Week | 2 Weeks | 1 Month |
|---|---|---|---|---|---|---|---|
| Hardness Shore A | D2240 | 97 | 97 | 97 | 97 | 97 | 97 |
| Drop Ball Resilience % | | 62 | 63 | 61 | 64 | 64 | 61 |
| Tensile, psi | D412 | 5792 | 5408 | 4981 | 4815 | 4680 | 5325 |
| Elongation, % | D412 | 455 | 480 | 397 | 456 | 434 | 468 |
| 100% Mod psi | D412 | 1838 | 1807 | 1830 | 1811 | 1802 | 1806 |
| 300% Mod psi | D412 | 2590 | 2319 | 2767 | 2391 | 2484 | 2406 |
| Split Tear, lb./in | D470 | 101 | 123 | 81 | 104 | 92 | 102 |
| Trouser Tear, lb/in | D1938 | 140 | 169 | 127 | 161 | 149 | 169 |
| Die C Tear, lb./in | D624 | 527 | 583 | 514 | 563 | 542 | 553 |
| Bashore Rebound, % | D2632 | 55 | 56 | 54 | 55 | 55 | 57 |
| Compression Set % (Method B) 22 hours @ 158° F. (70° C.) | D395-B | 31.7 | 30.4 | 30.6 | 29.6 | 30.4 | 29.7 |
| Compressive Mod., psi Third Cycle [aged] | | | | | | | |
| 5% | | 275 | 204 | 221 | 228 | 214 | 216 |
| 10% | D575 | 674 | 574 | 594 | 605 | 578 | 584 |
| 15% | | 1079 | 983 | 981 | 1006 | 976 | 975 |
| 20% | | 1546 | 1441 | 1415 | 1470 | 1427 | 1428 |
| 25% | | 2106 | 2002 | 1893 | 2021 | 1955 | 1957 |
| Specific Gravity | D792 | 1.101 | 1.098 | 1.102 | 1.103 | 1.101 | 1.105 |

TABLE VI

Physical properties of Adiprene LFM500/Caytur 31 premix aged at 70° C.

| Material: Adiprene LFM 500/Caytur 31 One Component premix (Aged @ 70° C.) | | No Aging | 24 Hours | 72 Hours | 1 Week | 2 Weeks | 1 Month |
|---|---|---|---|---|---|---|---|
| Hardness Shore A | D2240 | 97 | 97 | 97 | 97 | 97 | 95 |
| Drop Ball Resilience % | | 62 | 63 | 61 | 63 | 62 | 60 |
| Tensile, psi | D412 | 5792 | 5533 | 4251 | 5060 | 5236 | 5368 |
| Elongation, % | D412 | 455 | 474 | 396 | 472 | 481 | 487 |
| 100% Mod psi | D412 | 1838 | 1809 | 1830 | 1783 | 1760 | 1728 |
| 300% Mod psi | D412 | 2590 | 2386 | 2662 | 2353 | 2314 | 2274 |
| Split Tear, lb./in | D470 | 101 | 120 | 84 | 118 | 114 | 116 |
| Trouser Tear, lb/in | D1938 | 140 | 164 | 129 | 153 | 162 | 154 |
| Die C Tear, lb./in | D624 | 527 | 562 | 517 | 560 | 561 | 558 |
| Bashore Rebound, % | D2632 | 55 | 57 | 56 | 54 | 56 | 56 |

TABLE VI-continued

Physical properties of Adiprene LFM500/Caytur 31 premix aged at 70° C.

| Material: Adiprene LFM 500/Caytur 31 One Component premix (Aged @ 70° C.) | | No Aging | 24 Hours | 72 Hours | 1 Week | 2 Weeks | 1 Month |
|---|---|---|---|---|---|---|---|
| Compression Set % (Method B) 22 hours @ 158° F. (70° C.) | D395-B | 31.7 | 29.6 | 30.1 | 26.1 | 27.4 | 21.7 |
| Compressive Mod., psi Third Cycle [aged] | | | | | | | |
| 5% | | 275 | 194 | 192 | 248 | 208 | 200 |
| 10% | D575 | 674 | 546 | 531 | 591 | 529 | 492 |
| 15% | | 1079 | 940 | 902 | 947 | 884 | 810 |
| 20% | | 1546 | 1381 | 1320 | 1372 | 1295 | 1182 |
| 25% | | 2106 | 1911 | 1833 | 1887 | 1778 | 1651 |
| Specific Gravity | D792 | 1.100 | 1.103 | 1.100 | 1.098 | 1.098 | 1.089 |

TABLE VII

Viscosity profile of Adiprene LFM500/Caytur 31 at various times and temperatures

| Premix type | Oven Temperature | Viscosity @ 4 hours (cps) | Viscosity @ 24 hours (cps) | Viscosity @ 48 hours (cps) | Viscosity @ 72 hours (cps) | Viscosity @ 168 hours (cps) | Viscosity @ 720 hours (cps) |
|---|---|---|---|---|---|---|---|
| Adiprene LFM 500/Caytur 31 | 42.5° C. | 7600 | 10750 | 14050 | 23075 | 19150 | 50400 |
| | 50.0° C. | 5500 | 8650 | 12400 | 11900 | 10600 | 15300 |
| | 70.0° C. | 3500 | 4100 | 2975 | 2650 | 3075 | 7900 |

Example 5

Example 3 was duplicated with the exception that Adiprene LFP950A (PPDI-Terminated prepolymer) was substituted for Adiprene LF950A (TDI-Terminated prepolymer). The equivalent ratio of amine groups to isocyanate groups was 0.95.

Adiprene LFP950A/Caytur 31 one-component premix was cast into thick cylindrical sections of 13 cms minimum thickness (1200 grams) and cured successfully at 115° C. and 127° C. The physical property results are shown in Table IX and X. Viscosity data are shown in Table XI. Excellent results were obtained even after one month at 50° C. No film formation was observed even after 720 hours (4 weeks). All samples remained flowable.

TABLE IX

Physical properties of Adiprene LFP950/Caytur 31 premix aged at 50° C.

| Material: Adiprene LFP 950A/Caytur 31 One Component premix (Aged @ 50° C.) | | No Aging | 24 Hours | 72 Hours | 1 Week | 2 Weeks | 1 Month |
|---|---|---|---|---|---|---|---|
| Hardness Shore A | D2240 | 97 | 96 | 96 | 96 | 97 | 97 |
| Drop Ball Resilience % | | 58 | 57 | 56 | 58 | 58 | 59 |
| Tensile, psi | D412 | 4381 | 4241 | 3768 | 3915 | 4450 | 3517 |
| Elongation, % | D412 | 378 | 377 | 345 | 384 | 415 | 366 |
| 100% Mod psi | D412 | 1840 | 1863 | 1854 | 1872 | 1881 | 1820 |
| 300% Mod psi | D412 | 3065 | 2970 | 3058 | 2771 | 2735 | 2698 |
| Split Tear, lb./in | D470 | 63 | 65 | 64 | 69 | 75 | 77 |
| Trouser Tear, lb/in | D1938 | 93 | 99 | 95 | 102 | 119 | 113 |
| Die C Tear, lb./in | D624 | 514 | 538 | 477 | 529 | 510 | 522 |
| Bashore Rebound, % | D2632 | 51 | 52 | 51 | 51 | 53 | 52 |

TABLE IX-continued

Physical properties of Adiprene LFP950/Caytur 31 premix aged at 50° C.

| Material: Adiprene LFP 950A/Caytur 31 One Component premix (Aged @ 50° C.) | | No Aging | 24 Hours | 72 Hours | 1 Week | 2 Weeks | 1 Month |
|---|---|---|---|---|---|---|---|
| Compression Set % (Method B) 22 hours @ 158° F. (70° C.) | D395-B | 29.38 | — | 27.82 | 28.02 | 28.26 | 28.88 |
| Compressive Mod., psi Third Cycle [aged] | | | | | | | |
| 5% | | 222 | 189 | 189 | 177 | 188 | — |
| 10% | D575 | 654 | 598 | 584 | 596 | 622 | 220 |
| 15% | | 938 | 904 | 912 | 917 | 927 | 610 |
| 20% | | 1196 | 1123 | 1092 | 1139 | 1179 | 1026 |
| 25% | | 1674 | 1628 | 1595 | 1483 | 1688 | 1513 |
| Specific Gravity | D792 | 1.093 | 1.082 | 1.082 | 1.082 | 1.085 | 1.085 |

TABLE X

Physical properties of Adiprene LFP950/Caytur 31 premix aged at 70° C.

| Material: Adiprene LFP 950A/Caytur 31 One Component premix (Aged @ 70° C.) | | No Aging | 24 Hours | 72 Hours | 1 Week | 2 Weeks |
|---|---|---|---|---|---|---|
| Hardness Shore A | D2240 | 97 | 96 | 96 | 96 | 95 |
| Drop Ball Resilience % | | 58 | 58 | 58 | 59 | 58 |
| Tensile, psi | D412 | 4381 | 4003 | 4134 | — | 4077 |
| Elongation, % | D412 | 378 | 356 | 361 | — | 432 |
| 100% Mod psi | D412 | 1840 | 1836 | 1805 | — | 1718 |
| 300% Mod psi | D412 | 3065 | 2894 | 2942 | — | 2445 |
| Split Tear, lb./in | D470 | 63 | 68 | 61 | 77 | 73 |
| Trouser Tear, lb/in | D1938 | 93 | 107 | 101 | 117 | 119 |
| Die C Tear, lb./in | D624 | 514 | 517 | 502 | 533 | 517 |
| Bashore Rebound, % | D2632 | 51 | 51 | 49 | 51 | 53 |
| Compression Set % (Method B) 22 hours @ 158° F. (70° C.) | D395-B | 29.38 | 29.56 | 27.15 | 28.02 | 28.26 |
| Compressive Mod., psi Third Cycle [aged] | | | | | | |
| 5% | | 222 | 204 | 165 | 212 | 110 |
| 10% | D575 | 654 | 610 | 544 | 596 | 461 |
| 15% | | 938 | 913 | 898 | 924 | 811 |
| 20% | | 1196 | 1124 | 1039 | 1099 | 997 |
| 25% | | 1674 | 1590 | 1437 | 1573 | 1293 |
| Specific Gravity | D792 | 1.093 | 1.078 | 1.077 | 1.093 | 1.068 |

TABLE XI

Viscosity profile of Adiprene LFP950A/Caytur 31 at various times and temperatures

| Premix type | Oven Temperature | Viscosity @ 4 hours (cps) | Viscosity @ 24 hours (cps) | Viscosity @ 48 hours (cps) | Viscosity @ 72 hours (cps) | Viscosity @ 168 hours (cps) | Viscosity @ 720 hours (cps) |
|---|---|---|---|---|---|---|---|
| Adiprene LFP 950A/Caytur 31 | 42.5° C. | 6075 | 8175 | 8250 | 9150 | 9800 | 12250 |
|  | 50.0° C. | 4125 | 5550 | 5900 | 6225 | 6350 | 7225 |

Example 6

This example illustrates the beneficial effect of organic acid halide groups on the premix stability at elevated temperatures. Four premixes were prepared with different levels of acid chloride (COCl) groups by addition of orthophthaloyl chloride (OPC).

75 parts of Adiprene LF 950A was added to a metal/plastic can. Appropriate amount (based on weight of prepolymer) of acid chloride groups as shown in Table XII was added to the prepolymer and stirred. The prepolymer was heated to 55° and was degassed under vacuum (<25 mbar). The prepolymer was allowed to cool under vacuum. Once the prepolymer cooled to 50°, 25 parts of Caytur 31-DA was added under agitation. The equivalent ratio of amine groups to isocyanate groups was 0.95. The premix was agitated for 10 minutes using the drill mixer under a nitrogen sweep. At the end of 10 minutes the batch was packaged and sealed under nitrogen. The batch was aged at 70° C. to understand the effect of OPC on Adiprene LF 950A/Caytur 31-DA premix. The viscosity results are shown in Table XII.

31 addition was complete, the paint can was sealed under nitrogen and mixed for up to six minutes in a Red Devil paint mixer. The one-component blend was then either stored in the existing container or transferred to another container (Example 7). (b) 85.92 parts of Adiprene LF 800A and 14.08 parts of Caytur 31 were blended to form the one component premix using the process described above (Example 8). (c) 81.7 parts of Adiprene LFM 2400 and 18.3 parts of Caytur 31 were blended to form the one component premix using the process described above (Example 9). In all three cases, the blends were stored under nitrogen.

The blends were melted for a few hours in 50° C. oven before casting. The melted mixtures were then poured into molds in an oven with a temperature of at least 115° C. After the one-component blends solidified and were cured overnight the testing parts were allowed to cure further at room temperature for at least one month before testing. The physical property results are shown in Tables XIII, XIV and XV.

TABLE XII

Viscosity profile of Adiprene LF950A/Caytur 31 at various time and levels of acid chloride

| Adiprene LF950A/Caytur 31-DA Premix | | Viscosity No aging (cps) | Viscosity @ 1 hour (cps) | Viscosity @ 24 hours (cps) | Viscosity @ 48 hours (cps) | Viscosity @ 168 hours (cps) | Viscosity @ 336 hours (cps) | Viscosity @ 720 hours (cps) |
|---|---|---|---|---|---|---|---|---|
| COCl group | Acid Chloride | — | — |  |  | — |  |  |
| No COCl | No OPC | 470 | 13600 2 hr |  |  | Partially Cured |  |  |
| 31.3 ppm COCl | 50 ppm OPC | 1650 | 3700 2 hr |  |  | Partially Cured |  |  |
| 62.6 ppm COCl | 100 ppm OPC | 480 | 480 | 940 | 42400 | Partially cured |  |  |
| 125.1 ppm COCl | 200 ppm OPC | 510 | 510 | 1000 | 2005 | 9300 | 11850 | 36850 |
| 312.8 ppm COCl | 500 ppm OPC | 640 | 685 | 785 | 1545 | 2490 | 4040 | 30150 |

Examples 7, 8 & 9

These examples illustrate the long-term stability of one-component polyurethane compositions at room temperature when compositions are based on prepolymers from which unreacted diisocyanate monomers have been at least partially removed. (a) 74.5 parts of Adiprene LF 950A was added to a paint can. The prepolymer temperature was maintained at 50° C. and 25.5 parts of Caytur 31 (amine/isocyanate equivalent ratio was 96%) was added under agitation. Once the Caytur

TABLE XIII

Physical properties of Adiprene LF950/Caytur 31 premix aged at room temperature

| Material: Adiprene LF 950A/Caytur 31 One Component premix (Aged @ room temperature) | | No Aging | 1 year |
|---|---|---|---|
| Hardness Shore A | D2240 | 95 | 93 |

TABLE XIII-continued

Physical properties of Adiprene LF950/Caytur 31 premix aged at room temperature

| Material: Adiprene LF 950A/Caytur 31 One Component premix (Aged @ room temperature) | | No Aging | 1 year |
|---|---|---|---|
| Tensile, psi | D412 | 4238 | 3049 |
| Elongation, % | D412 | 370 | 317 |
| 100% Mod psi | D412 | 1525 | 1271 |
| 300% Mod psi | D412 | 2888 | 2902 |
| Split Tear, lb./in | D470 | 69 | 64 |
| Trouser Tear, lb/in | D1938 | 91 | 91 |
| Die C Tear, lb./in | D624 | 339 | 351 |
| Bashore Rebound, % | D2632 | 52 | 45 |
| Compression Set % (Method B) 22 hours @ 158° F. (70° C.) | D395-B | 28.4 | 28.7 |

TABLE XIV

Physical properties of Adiprene LF800/Caytur 31 premix aged at room temperature

| Material: Adiprene LF 800A/Caytur 31 One Component premix (Aged @ room temperature) | | No Aging | 3 months | 9 months | 1 year |
|---|---|---|---|---|---|
| Hardness Shore A | D2240 | 80 | 80 | 82 | 80 |
| Tensile, psi | D412 | 2368 | 2513 | 2621 | 3424 |
| Elongation, % | D412 | 625 | 616 | 617 | 635 |
| 100% Mod psi | D412 | 561 | 589 | 593 | 609 |
| 300% Mod psi | D412 | 849 | 883 | 889 | 932 |
| Split Tear, lb./in | D470 | 62 | 55 | 47 | 46 |
| Trouser Tear, lb/in | D1938 | 78 | 70 | 81 | 69 |
| Die C Tear, lb./in | D624 | 322 | 326 | 324 | 307 |
| Bashore Rebound, % | D2632 | 59 | 59 | 59 | 60 |
| Compression Set % (Method B) 22 hours @ 158° F. (70° C.) | D395-B | 27.3 | 28.4 | 29.4 | 29 |

TABLE XV

Physical properties of Adiprene LFM 2400/Caytur 31 premix aged at room temperature

| Material: Adiprene LFM 2400A/Caytur 31 One Component premix (Aged @ room temperature) | | No Aging | 6 months |
|---|---|---|---|
| Hardness Shore A | D2240 | 93 | 92 |
| Tensile, psi | D412 | 5843 | 4271 |
| Elongation, % | D412 | 483 | 468 |
| 100% Mod psi | D412 | 1295 | 1219 |
| 300% Mod psi | D412 | 1857 | 1647 |
| Split Tear, lb./in | D470 | 87 | 137 |
| Trouser Tear, lb/in | D1938 | 134 | 172 |
| Die C Tear, lb./in | D624 | 454 | 533 |
| Bashore Rebound, % | D2632 | 54 | 56 |
| Compression Set % (Method B) 22 hours @ 158° F. (70° C.) | D395-B | 29.7 | 29.4 |

Comparative Example E

Example 9 was duplicated with the exception that Vibrathane 8030 (MDI-Terminated polycaprolactone prepolymer) was substituted for Adiprene LFM 2400 (MDI-Terminated polycaprolactone prepolymer). The equivalent ratio of amine groups to isocyanate groups was 0.96. Diisocyanate monomer removal step was not used in the production of Vibrathane 8030. Such a removal step was used in the production of LFM 2400.

The premix based on Vibrathane 8030 solidified in less than 3 months at room temperature illustrating the benefits of using urethane prepolymers with reduced free monomer content as in example 9.

Thus, whereas there have been described what are presently believed to be the preferred embodiments of the present invention, those skilled in the art will realize that other and further embodiments can be made without departing from the spirit of the invention, and it is intended to include all such further modifications and changes as come within the true scope of the claims set forth herein.

We claim:

1. A storage-stable flowable, one component polyurethane composition comprising
  (a) one or more isocyanate-terminated polyurethane prepolymers derived from one or more hydrocarbon ring-containing diisocyanates or triisocyanates and one or more polyols;
  (b) one or more metal salt complexes of methylenedianiline; and
  (c) one or more organic acid halide compounds having one or more acid halide groups, wherein the acid halide groups are present in a concentration of from about 100 parts per million to about 20,000 parts per million by weight of the polyurethane prepolymer,
  prepared by a process comprising adding one or more organic acid halide compounds having one or more acid halide groups, to one or more isocyanate-terminated polyurethane prepolymers, said prepolymer prepared from a polyol and a hydrocarbon ring-containing diisocyanate or triisocyanate, to form a prepolymer/acid halide mixture, mixing said mixture,
  and then adding to the mixture, under agitation, one or more metal salt complexes of methylenedianiline and mixing to obtain the storage-stable flowable, one component polyurethane composition,
  which composition has a viscosity below 100,000 centipoise at 50° C., and remains flowable and non-elastomeric, as determined at about 50° C., for at least ninety days at a temperature of about 35° C., and at least about fourteen days at a temperature of about 50° C. to about 70° C. which composition forms a polyurethane elastomer product upon heating to a temperature in a range of about 100° C. to 150° C.

2. The storage-stable flowable, one component polyurethane composition according to claim 1, wherein the polyurethane prepolymer is prepared from a polyol and one or more hydrocarbon ring-containing diisocyanates selected from the group consisting of paraphenylene diisocyanate, tolidene diisocyanate, isophorone diisocyanate, isomers of methylene bis(phenylisocyanate), isomers of toluene diisocyanate, diphenyl-4,4'-diisocyanate, dibenzyl-4,4'-diisocyanate, stilbene-4,4'-diisocyanate, benzophenone-4,4'diisocyanate, 1,3- and 1,4-xylene diisocyanates, 1,3-cyclohexyl diisocyanate, 1,4-cyclohexyl diisocyanate, 4,4'-methylene bis(phenylisocyanate), isomers of 1,1'-methylene-bis(4-isocyanatocyclohexane), isomers of benzenetriisocyanate, toluene-2,4,6-triisocyanate, 2,4,4'-triisocyanatediphenylether, and tolylene and xylylene diisocyanate derivatives of trimethylolpropane.

3. The storage-stable flowable, one component polyurethane composition according to claim 1, wherein the one or more organic acid halide compounds having one or more acid halide groups is selected from the group consisting of adipoyl chloride, benzoyl chloride, phthaloyl chloride, isophthaloyl chloride, terephthaloyl chloride, acetyl chloride, palmitoyl chloride, p-nitrobenzoyl chloride, 2-chlorobenzoyl chloride, 3-chlorobenzoyl chloride, 4-chlorobenzoyl chloride, oleoyl chloride, and stearoyl chloride.

4. The storage-stable flowable, one component polyurethane composition according to claim 1 wherein the polyurethane prepolymer is prepared from a polyol and one or more hydrocarbon ring-containing diisocyanates selected from the group consisting of methylene diphenyl diisocyanate, paraphenylene diisocyanate and toluene diisocyanate and the one or more organic acid halide compounds having one or more acid halide groups is selected from the group consisting of benzoyl chloride, phthaloyl chloride, isophthaloyl chloride, terephthaloyl chloride, p-nitrobenzoyl chloride, 2-chlorobenzoyl chloride, 3-chlorobenzoyl chloride and 4-chlorobenzoyl chloride.

5. The storage-stable flowable, one component polyurethane composition according to claim 1 having a viscosity below 30,000 centipoise at 50° C.

* * * * *